(12) United States Patent
Eiraku et al.

(10) Patent No.: US 7,912,599 B2
(45) Date of Patent: Mar. 22, 2011

(54) INTERNAL COMBUSTION ENGINE CONTROL APPARATUS AND METHOD

(75) Inventors: Akira Eiraku, Sunto-gun (JP); Naoki Kokubo, Nukata-gun (JP)

(73) Assignees: Toyota Jidosha Kabushiki Kaisha, Toyota-shi (JP); Denso Corporation, Kariya (JP)

( * ) Notice: Subject to any disclaimer, the term of this patent is extended or adjusted under 35 U.S.C. 154(b) by 574 days.

(21) Appl. No.: 12/020,832

(22) Filed: Jan. 28, 2008

(65) Prior Publication Data

US 2008/0201034 A1    Aug. 21, 2008

(30) Foreign Application Priority Data

Feb. 19, 2007    (JP) ................ 2007-038455

(51) Int. Cl.
*G01M 17/00*    (2006.01)
(52) U.S. Cl. ....... 701/29; 701/103; 701/104; 123/41.02; 340/438

(58) Field of Classification Search ............... 701/29, 701/33, 36, 103, 104; 340/425.5, 438, 439; 123/41.15, 41.1, 41.17, 41.02
See application file for complete search history.

(56) References Cited

U.S. PATENT DOCUMENTS

2006/0213461 A1*    9/2006    Hayami ............... 123/41.15

FOREIGN PATENT DOCUMENTS

| JP | 60-85215 | 5/1985 |
| JP | 6-280561 | 10/1994 |
| JP | 2002-276362 | 9/2002 |

* cited by examiner

*Primary Examiner* — Gertrude Arthur Jeanglaud
(74) *Attorney, Agent, or Firm* — Oblon, Spivak, McClelland, Maier & Neustadt, L.L.P.

(57) ABSTRACT

An internal combustion engine control apparatus includes: a fuel injector; a cooling fan of a radiator that radiates the heat of coolant in a coolant passage in the internal combustion engine; a flow rate control mechanism that variably controls the flow rate of the coolant; an abnormality detector that detects an abnormality of the cooling fan; and a controller that controls the amount of fuel injected from the fuel injector to the internal combustion engine and the operation of the flow rate control mechanism in accordance with the result of the abnormality detector.

16 Claims, 3 Drawing Sheets

INTERNAL COMBUSTION ENGINE CONTROL APPARATUS AND METHOD

INCORPORATION BY REFERENCE

The disclosure of Japanese Patent Application No. 2007-38455 filed on Feb. 19, 2007 including the specification, drawings and abstract is incorporated herein by reference in its entirety.

BACKGROUND OF THE INVENTION

1. Field of the Invention

The invention relates to an internal combustion engine apparatus and an internal combustion engine control method.

2. Description of the Related Art

Japanese patent application publications No. 60-85215 (JP-A-60-85215) and No. 2002-276362 (JP-A-2002-276362) each describe an internal combustion engine cooling system in which coolant is delivered to coolant passages (water jacket) in the internal combustion engine using a water pump to absorb the heat from the internal combustion engine. The internal combustion engine cooling system sends the coolant that has been heated by absorbing the heat from the internal combustion engine to the radiator so that the heat of the coolant is radiated to the atmosphere.

A fan is provided at the radiator to facilitate the heat radiation from the coolant. However, upon an operation failure of the fan, the heat radiation from the coolant becomes insufficient and thus the absorption of the heat from the internal combustion engine becomes insufficient. If the vehicle continues running in this state, the internal combustion engine may overheat.

SUMMARY OF THE INVENTION

The invention provides an internal combustion engine control apparatus and an internal combustion engine control method that prevent the overheating of the internal combustion engine even when the cooling fan of the radiator is not normally operating.

Aspects of the invention relates to an internal combustion engine control apparatus and method, including: a fuel injector; a flow rate control mechanism that variably controls the flow rate of the coolant in a coolant passage in the internal combustion engine; and controlling portion for detecting whether a cooling fan of a radiator that radiates the heat of the coolant have an abnormality and controlling, in accordance with the result of the detection, the amount of fuel injected from the fuel injector and the operation of the flow rate control mechanism. According to this apparatus and method, when the cooling fan has an abnormality, in order to prevent an excessive increase in the temperature of the coolant, the flow rate of the coolant is reduced so that the amount of heat absorbed by the coolant decreases. While then, the amount of fuel injected from the fuel injector is increased so that the vaporization heat of fuel suppresses an increase in the temperature of the internal combustion engine and thus the overheating of the internal combustion engine is prevented. As such, the internal combustion engine control apparatus and method of the invention prevents the overheating of the internal combustion engine even when the cooling fan of the radiator has an abnormality.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF EMBODIMENTS

Figure 1:
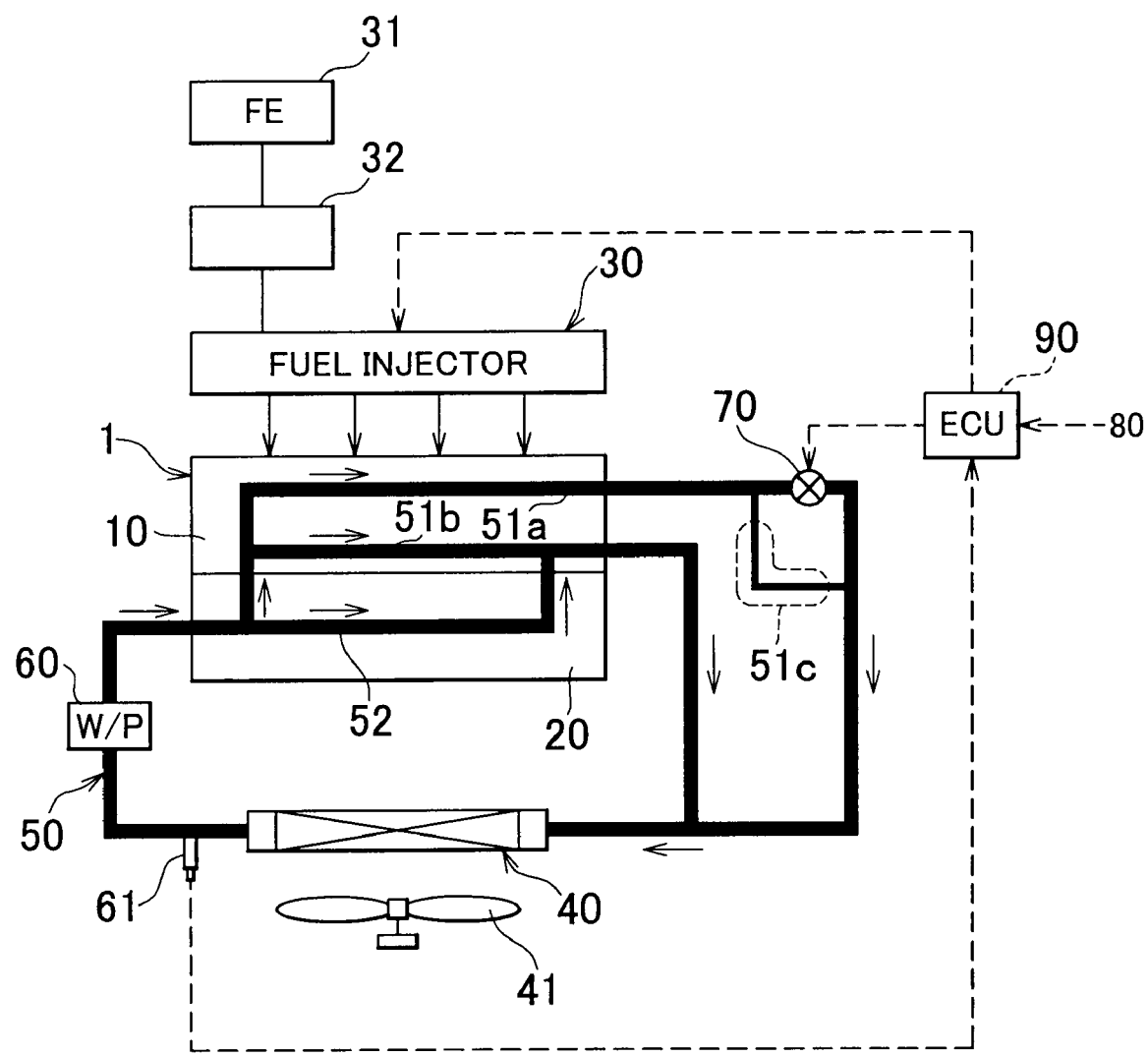
FIG. 1 is a view schematically showing the configuration of an internal combustion engine control apparatus according to an example embodiment of the invention.

Hereinafter, an internal combustion engine control apparatus according to an example embodiment of the invention will be described with reference to the drawings. FIG. 1 schematically shows the configuration of the internal combustion engine control apparatus of this example embodiment.

Referring to FIG. 1, the internal combustion engine control apparatus is constituted of an engine 1, a fuel injector 30, a radiator 40, a coolant circulation passage 50, a water pump 60, a vehicle speed sensor 80, an ECU 90, etc.

The ECU 90 is constituted of a CPU (Central Processing Unit), a ROM (Read Only Memory), a RAM (Random Access Memory), etc., and controls various components including the fuel injector 30. The engine 1 is constituted of a cylinder head 10, a cylinder block 20, etc.

The fuel injector 30 injects fuel into the respective engine cylinders (not shown in the drawings) of the engine 1. The amount of fuel injected from the fuel injector 30 is controlled based on the command from the ECU 90. Fuel is supplied to the fuel injector 30 from a fuel tank 31 via a fuel pump 32. The coolant circulation passage 50 is a passage in which to circulate the coolant for cooling the engine 1. Detail of the coolant circulation passage 50 will be described later.

The radiator 40 is connected to the coolant circulation passage 50 and cools the coolant by radiating its heat to the air passing during traveling. A cooling fan 41 is used to send air to the radiator 40 to assist heat radiation of the radiator 40.

A water pump 60 circulates the coolant in the coolant circulation passage 50. A flow-rate control valve 70 is provided at a given position in the coolant circulation passage 50 and operates in accordance with the command from the ECU 90. A vehicle speed sensor 80 outputs signal indicating a vehicle speed V representing the present speed of the vehicle.

Inside the cylinder head 10 and the cylinder block 20 are formed, an exhaust side coolant passage 51a, an intake side coolant passage 51b, and a cylinder-block side coolant passage 52. The exhaust side coolant passage 51a, the intake side coolant passage 51b, and the cylinder-block side coolant passage 52 are collectively referred to as "water jacket".

The exhaust side coolant passage 51a, the intake side coolant passage 51b, and the cylinder-block side coolant passage 52 are branched from a common passage in the engine 1 and extend along the direction in which the engine cylinders are lined up. Thus, in the engine 1, the coolant passage is branched into multiple passages. The exhaust side coolant passage 51a and the intake side coolant passage 51b are formed in the cylinder head 10 while the cylinder-block side coolant passage 52 is formed in the cylinder block 20.

Figure 2:
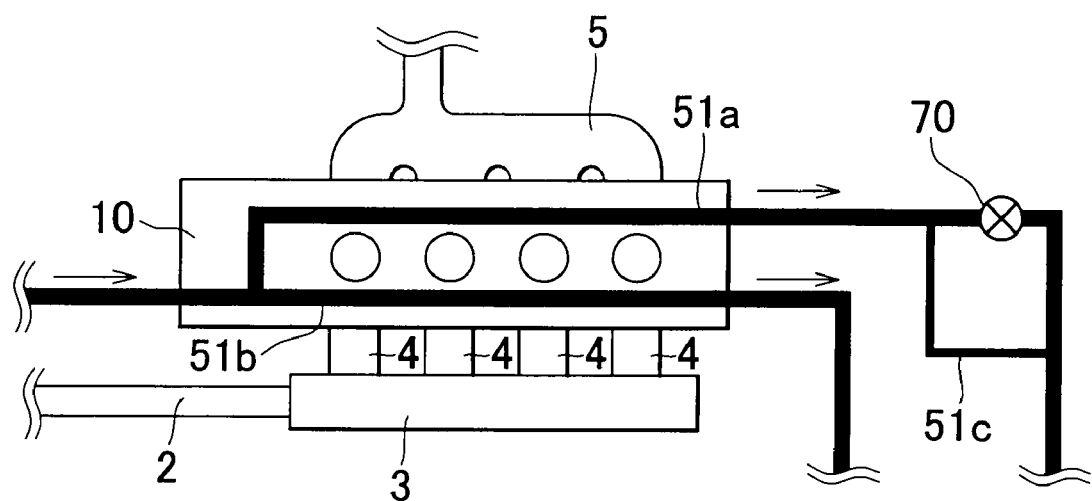
FIG. 2 is a view schematically illustrating the exhaust side coolant passage and the intake side coolant passage extend through the cylinder head of the internal combustion engine.

The exhaust side coolant passage 51a and the intake side coolant passage 51b will be described with reference to FIG. 1 and FIG. 2. FIG. 2 is a view schematically illustrating the exhaust side coolant passage 51a and the intake side coolant passage 51b extend through the cylinder head 10. Note that FIG. 2 is a simplified view, so that the fuel injector 30 is not shown.

Referring to FIG. 2, the exhaust side coolant passage 51a extends through the periphery of an exhaust port 5. That is, the exhaust side coolant passage 51a is arranged to cool the periphery of the exhaust port 5.

On the other hand, the intake side coolant passage 51b extends through the periphery of each intake port 4. That is, the intake side coolant passage 51b is arranged to cool the periphery of each intake port 4. An intake pipe 2 is connected to a surge tank 3, and the intake air is distributed to the respective engine cylinders via the intake ports 4. Exhaust gas is discharged from each engine cylinder to the exhaust port 5.

The cross section of the exhaust side coolant passage 51a is larger than those of the intake side coolant passage 51b and the cylinder-block side coolant passage 52, therefore the heat-adsorbing capacity of the coolant at the exhaust side coolant passage 51a is larger than those of the coolant at the intake side coolant passage 51b and the coolant at the cylinder-block side coolant passage 52.

Next, a description will be made of the reason why the exhaust side coolant passage 51a is formed such that the heat-absorbing capacity of the coolant at the exhaust side coolant passage 51a is larger than those of the coolant at the intake side coolant passage 51b and the coolant at the cylinder-block side coolant passage 52. When the engine 1 is running at a high speed, generally the temperature of the engine 1 is high. At this time, in particular, the temperature of exhaust gas increases, and such an increase in the exhaust gas temperature causes an increase in the temperature in the periphery of the exhaust port 5. For the purpose of preventing the overheating of the engine 1 due to such a temperature increase, related technology has been proposed which makes the air-fuel ratio fuel-rich by increasing the fuel injection amount so that the increase in the engine temperature is suppressed by the vaporization heat of fuel. In this method, however, the fuel economy deteriorates even though the engine overheating can be avoided.

Namely, it is possible to suppress the increase in the engine temperature at a high engine speed by separating the engine coolant passage in the cylinder head 10 into the exhaust side coolant passage 51a and the intake side coolant passage 51b and making the cross section of the exhaust side coolant passage 51a relatively large so that the heat-absorbing capacity of the coolant at the exhaust side coolant passage 51a is larger than that of the coolant at the intake side coolant passage 51b as in the internal combustion engine control apparatus of the example embodiment. According to this structure, even when the engine 1 is running at a high speed, an excessive increase in the engine temperature can be avoided and thus deterioration of the fuel economy can be avoided even without making the air-fuel ratio fuel-rich.

Referring to FIG. 1, the intake side coolant passage 51b and the cylinder-block side coolant passage 52 converge in the downstream side. Further, the flow rate control valve 70 is arranged downstream of the downstream end of the exhaust side coolant passage 51a. A bypass passage 51c is formed so as to bypass the flow rate control valve 70. The cross section of the bypass passage 51c is smaller than those of other coolant passages including the exhaust side coolant passage 51a, the intake side coolant passage 51b, and the cylinder-block side coolant passage 52.

Next, an example of the control routine that the ECU 90 executes to avoid the overheating of the engine 1 will be described with reference to FIG. 3.

Figure 3:
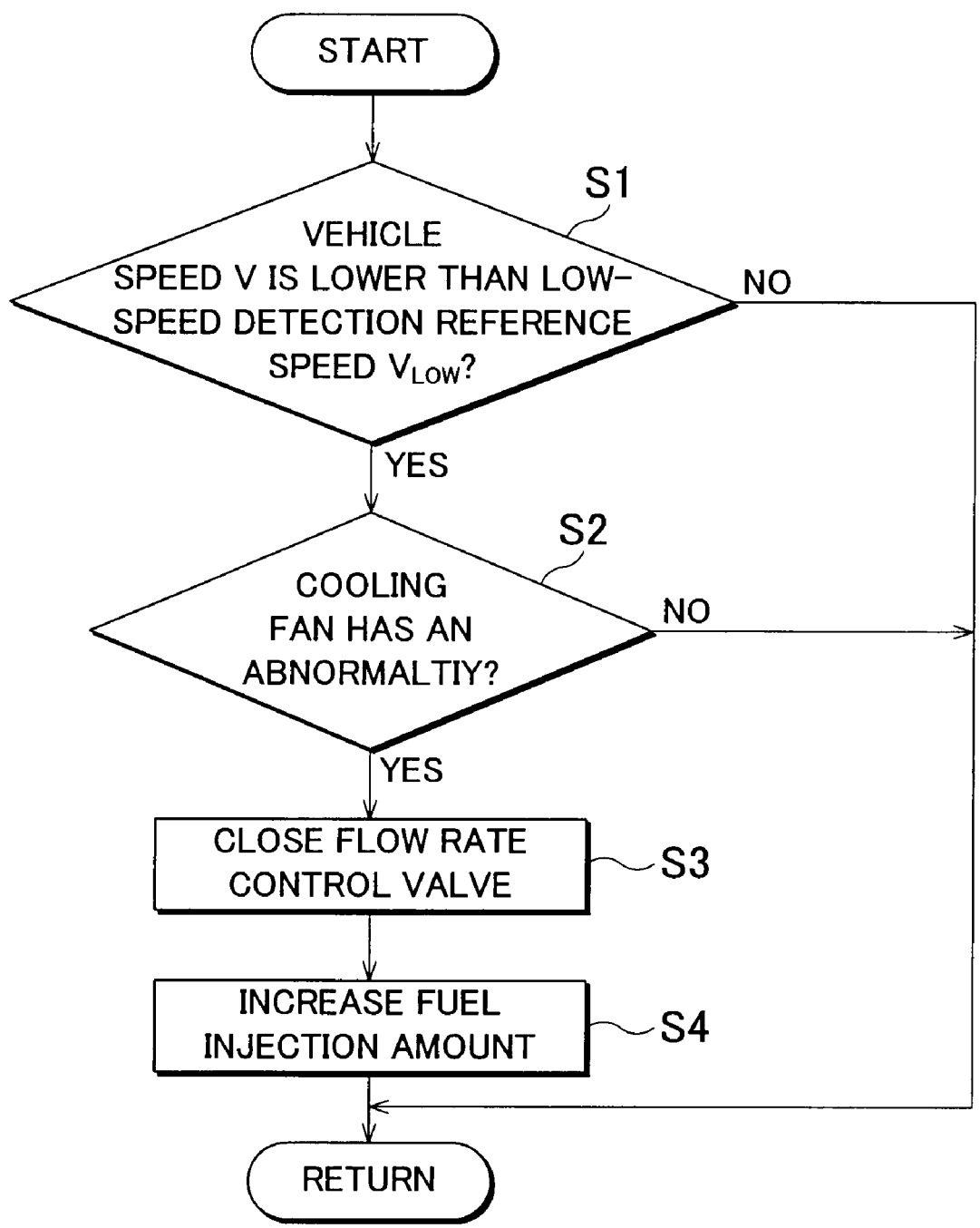
FIG. 3 is a flowchart showing an example of the control routine that the ECU executes to prevent the overheating of the internal combustion engine.

Referring to FIG. 3, in this control routine, the ECU 90 first determines whether the vehicle speed V detected by the vehicle speed sensor 80 is lower than a low-speed detection reference speed $V_{LOW}$ (step 1). More specifically, in this step, the ECU 90 determines whether the value detected by the vehicle speed sensor 80 is smaller than a reference value. If it is determined that the vehicle speed V is lower than the low-speed detection reference speed $V_{LOW}$, it indicates that the air flowing toward the radiator 40 during traveling is weak and thus the amount of heat that can be radiated from the coolant via the radiator 40 is small. That is, the overheating of the engine 1 tends to occur when the vehicle is running at a low speed.

If it is determined in step 1 that the vehicle speed V is lower than the low-speed detection reference speed $V_{LOW}$, the ECU 90 then determines whether the cooling fan 41 presently has an abnormality (step 2). More specifically, in this step, the ECU 90 determines whether the temperature detected by the coolant temperature sensor 61 is higher than a reference temperature. If it is higher than the reference temperature, the ECU 90 determines that the cooling fan 41 presently has an abnormality. When the cooling fan 41 presently has an abnormality, it makes it more difficult to radiate the heat of the coolant via the radiator 40 and thus the possibility of overheating of the engine 1 increases.

If it is determined in step 2 that the cooling fan 41 presently has an abnormality, the ECU 90 then issues a command to close the flow rate control valve 70 (step 3). When the flow rate control valve 70 is closed, the coolant flow rate at the exhaust side coolant passage 51a decreases, and thus, the coolant from the exhaust side coolant passage 51a flows to the radiator 40 via the bypass passage 51c.

Because the coolant flow rate at the exhaust side coolant passage 51a is being reduced, the heat-absorbing capacity of the coolant at the exhaust side coolant passage 51a decreases, and this causes an increase in the temperature of the periphery of the exhaust port 5 of the cylinder head 10. To overcome this, the ECU 90 executes the following process.

That is, the ECU 90 issues a command to increase the fuel injection amount of the fuel injector 30 (step 4), so that the air-fuel ratio becomes fuel-rich and the heat in each engine cylinder is absorbed by the vaporization heat of fuel and the temperature of the periphery of the exhaust port 5 decreases. As such, by executing the process, an excessive increase in the temperature of the engine 1 is avoided, therefore the overheating of the engine 1 is avoided.

Accordingly, if the vehicle speed V is determined to be a speed lower than the low-speed detection reference speed $V_{LOW}$ and the cooling fan 41 is determined to have an abnormality, the ECU 90 takes it as a indication before the occurrence of overheating of the engine 1. In this case, the ECU 90 executes step 3 and step 4 to avoid the overheating of the engine 1.

Further, because the flow rate control valve 70 reduces the coolant flow rate at the exhaust side coolant passage 51a, the amount of heat that the coolant absorbs from the cylinder head 10 is effectively reduced, therefore an excessive increase in the coolant temperature is avoided.

While the invention has been described with reference to the example embodiment thereof, it is to be understood that the invention is not limited to the example embodiment and construction. To the contrary, the invention is intended to cover various modifications and equivalent arrangements within the sprit and scope of the invention.

While the determination as to the abnormality of the cooling fan 41 is performed based on the output of the coolant temperature sensor 61 in the foregoing example embodiment, an abnormality of the cooling fan 41 may be detected using physical detecting means. For example, a hall element that converts a change in magnetic field caused by the rotation of a motor of the cooling fan 41 into electric signal and outputs the electric signal may be provided. In this case, the ECU 90 may detect that the cooling fan 41 has an abnormality when the signal form the hall element is indicating that the motor is not running despite that the ECU 90 is sending an operation command to the cooling fan 41.

In the foregoing example embodiment, if the vehicle speed V is lower than the low-speed detection reference speed $V_{LOW}$, the lower the vehicle speed V, the more the ECU 90 may increase the fuel injection amount.

What is claimed is:

1. An internal combustion engine control apparatus, comprising:
    a fuel injector;
    a cooling fan of a radiator that radiates the heat of coolant in a coolant passage in the internal combustion engine;
    a flow rate control mechanism that variably controls the flow rate of the coolant;
    an abnormality detector that detects an abnormality of the cooling fan; and
    a controller that controls the amount of fuel injected from the fuel injector to the internal combustion engine and the operation of the flow rate control mechanism in accordance with the result of the abnormality detector, wherein:
    the controller increases the amount of fuel injected from the fuel injector to the internal combustion engine in response to the abnormality detector detecting the abnormality of the cooling fan.

2. The internal combustion engine control apparatus according to claim 1, wherein:
    the coolant passage includes a plurality of coolant passages running through different paths; and
    the flow rate control mechanism adjusts the coolant flow rate at which the coolant passage having the largest heat-absorbing capacity among the plurality of coolant passages.

3. The internal combustion engine control apparatus according to claim 2, wherein:
    the coolant passage having the largest heat-absorbing capacity is an exhaust side coolant passage that is provided in the exhaust side of the internal combustion engine.

4. The internal combustion engine control apparatus according to claim 2, wherein:
    a cross section of the coolant passage having the largest heat-absorbing capacity is largest among the plurality of coolant passages.

5. The internal combustion engine control apparatus according to claim 2, wherein:
    the controller reduces the coolant flow rate at the coolant passage having the largest heat-absorbing capacity when the abnormality detector detects an abnormality of the cooling fan.

6. The internal combustion engine control apparatus according to claim 2, wherein:
    the flow rate control mechanism includes a flow rate control valve and a bypass passage that bypasses the flow rate control valve; and
    a cross section of the bypass passage is smaller than the cross section of any of the plurality of coolant passages.

7. The internal combustion engine control apparatus according to claim 3, wherein:
    the flow rate control mechanism includes a flow rate control valve and a bypass passage that bypasses the flow rate control valve;
    a cross section of the bypass passage is smaller than the cross section of any of the plurality of coolant passages; and
    the flow rate control mechanism is provided downstream of the exhaust side coolant passage.

8. The internal combustion engine control apparatus according to claim 7, wherein:
    the controller closes the flow rate control valve such that the coolant flows from the exhaust side coolant passage to the radiator via the bypass passage when the abnormality detector detects the abnormality of the cooling fan.

9. The internal combustion engine control apparatus according to claim 1, further comprising a temperature detector that detects the temperature of the coolant, wherein:
    the abnormality detector detects that the cooling fan has an abnormality when the temperature of the coolant is higher than a reference temperature.

10. The internal combustion engine control apparatus according to claim 1, further comprising a hall element that converts a change in magnetic field caused by the rotation of a motor of the cooling fan into electric signal and outputs the electric signal, wherein:
    the abnormality detector detects that the cooling fan has an abnormality when no change occurs in the electric signal of the hall element in response to an operation command given to the cooling fan.

11. The internal combustion engine control apparatus according to claim 1, further comprising a speed detector that detects the speed of a vehicle incorporating the internal combustion engine, wherein:
    the controller controls the fuel injection amount and the operation of the flow rate control mechanism in accordance with the speed of the vehicle.

12. The internal combustion engine control apparatus according to claim 11, wherein:
    when an abnormality of the cooling fan has been detected by the abnormality detector and the speed of the vehicle is lower than a reference vehicle speed, the controller reduces the coolant flow rate at the passage having the largest heat-absorbing capacity and increases the amount of fuel injected from the fuel injector to the internal combustion engine to an amount larger than a normal state.

13. The internal combustion engine control apparatus according to claim 12, wherein:
    when the speed of the vehicle is lower than the reference temperature, the lower the speed of the vehicle, the more the controller increases the fuel injection amount.

14. An internal combustion engine control method, comprising:
    detecting whether a cooling fan of a radiator for radiating the heat of a coolant for cooling the internal combustion engine has an abnormality; and
    controlling, in accordance with the result of the detection, the amount of fuel injected to the internal combustion engine and the operation of a flow rate control mechanism that variably controls the flow rate of the coolant, wherein
    the amount of fuel injected from the fuel injector to the internal combustion engine is increased in response to detecting the abnormality of the cooling fan.

15. The internal combustion engine control method according to claim 14, further comprising detecting the speed of a vehicle incorporating the internal combustion engine, wherein:

the cooling fan is determined to have an abnormality when the speed of the vehicle is lower than a reference vehicle speed.

16. An internal combustion engine control method according to claim 14, further comprising closing a flow rate control valve such that the coolant flows from an exhaust side coolant passage to the radiator via a bypass passage in response to detecting the abnormality of the cooling fan.

* * * * *